United States Patent [19]

Haugen

[11] 4,161,157

[45] Jul. 17, 1979

[54] ANIMAL LITTER CONTAINER

[76] Inventor: Donald J. Haugen, 709 W. Huron St., Ann Arbor, Mich. 48103

[21] Appl. No.: 796,591

[22] Filed: May 13, 1977

[51] Int. Cl.$^2$ .............................................. A01K 1/00
[52] U.S. Cl. ........................................................ 119/1
[58] Field of Search ............................................ 119/1

[56] References Cited

U.S. PATENT DOCUMENTS

| | | | |
|---|---|---|---|
| 3,246,630 | 4/1966 | Dearing et al. | 119/1 |
| 3,310,031 | 3/1967 | Lowe, Jr. | 119/1 |
| 3,831,557 | 8/1974 | Elesh | 119/1 |

*Primary Examiner*—Louis G. Mancene
*Assistant Examiner*—Daniel J. Leach
*Attorney, Agent, or Firm*—Schwartz, Jeffery, Schwaab, Mack, Blumenthal & Koch

[57] ABSTRACT

An enclosed litter container for animals, the container having upper and lower enclosure portions coupled together to provide an enclosed space. The upper enclosure portion has an opening therein to provide access for an animal to the enclosed space. The lower enclosure portion defines a cavity for containing litter. The upper enclosure portion includes a widened rim portion, and the lower enclosure portion includes a mating widened flange portion. Part of the widened rim portion of the upper enclosure portion includes a downwardly convex convolution having a vertex or free extremity extending into the enclosed space. The construction prevents urine from collecting in and/or escaping from the joint between the enclosure portions. A series of downwardly sloped channels in the widened flange portion of the lower enclosure portion help direct the urine toward the litter.

17 Claims, 4 Drawing Figures

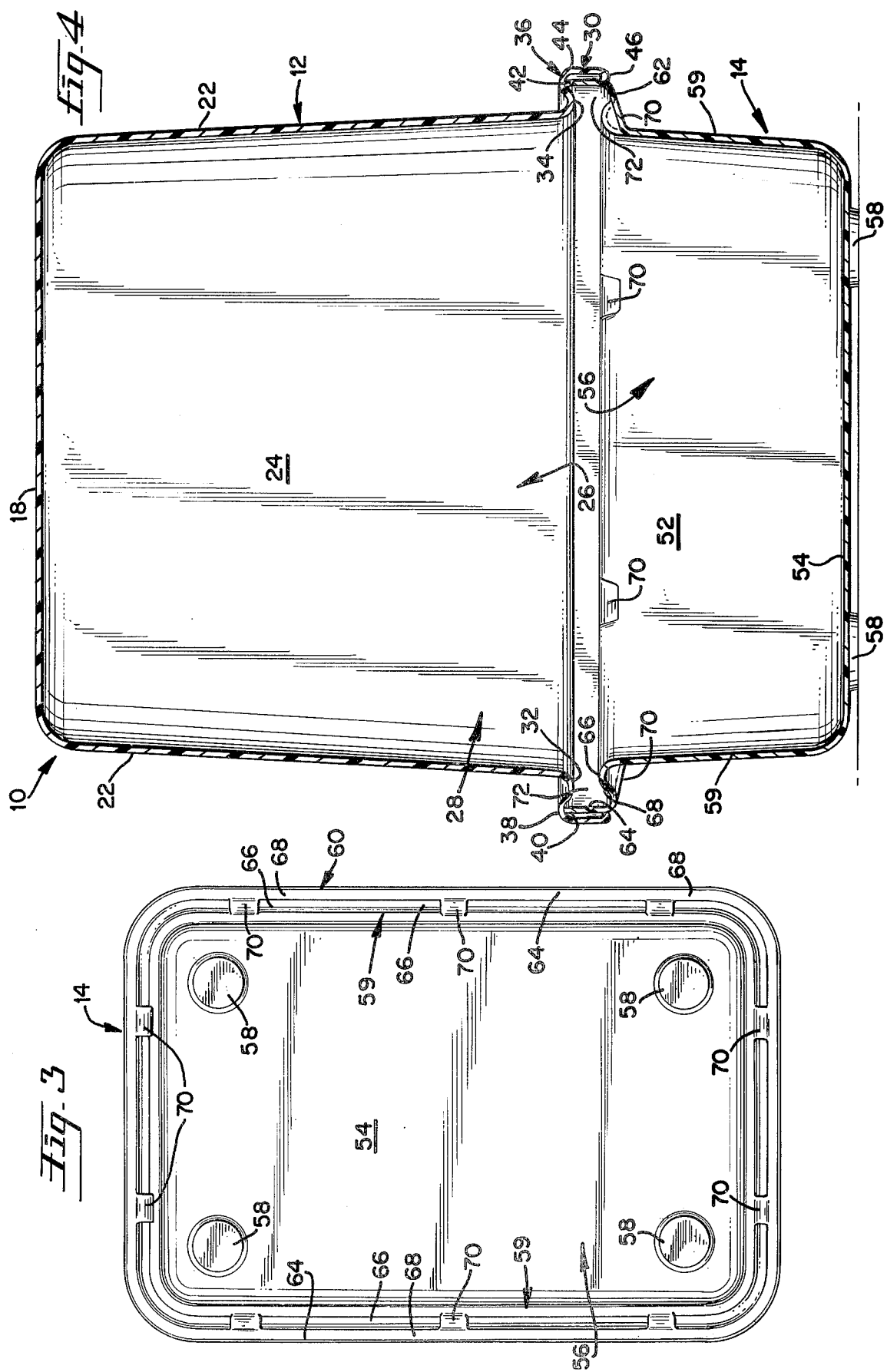

ANIMAL LITTER CONTAINER

BACKGROUND AND OBJECTS

1. Field of the Invention

The present invention relates to an enclosed sanitary facility for animals, and more particularly to an enclosed indoor commode for use by cats.

2. Description of the Prior Art

It is well known to provide indoor toilet facilities for household pets, particularly cats. Such facilities are normally used to contain a loose, absorbent material, such as granulated clay, for receiving animal excretions. The material is commonly referred to as litter.

It has previously been known to provide litter containers which are completely enclosed but which include an opening for providing access for the animal to the enclosed space. Examples of completely enclosed litter containers are found in U.S. Pat. No. 3,246,630 to Dearing et al, U.S. Pat. No. 3,885,523 to Coleman, and U.S. Pat. No. 394,258, filed Sept. 5, 1973, and now abandoned. These devices include upper and lower enclosure portions which are removably joined together. The lower enclosure portion contains the litter, and the upper enclosure portion may be separated therefrom to allow for cleaning of the container and changing of the litter.

A drawback of some known devices having separable upper and lower enclosure portions is that certain pets have a tendency to spray urine against the inside walls of the container. This urine may leak from the joint between the enclosure portions to the exterior of the container and it may also collect in the region of the joint and cause odor problems.

Preventing urine from collecting in the joint or leaking therefrom conflicts with providing low cost construction, ease of separability of the enclosure portions and use of a resilient, unbreakable, thin walled material in the construction of the container. While the aforementioned U.S. Patent to Coleman shows a construction which may minimize the problem of urine leakage or collection of urine in the joints between the enclosure portions, the construction does not provide the advantages of simplicity, low cost, ease of manufacturing, ease of separation of the enclosure portions, and use of a resilient material in construction.

In this regard, it is advantageous to provide a device wherein each enclosure portion has a one-piece construction and is molded from low density polyethylene or other resilient plastic material. In such a device it is desirable to provide a widened flange or widened rim portion on each enclosure portion. The rim and flange strengthen and add rigidity to the enclosure portions and provide a relatively rigid bearing region for joining the two enclosure portions together. Also, the widened rim portion on the upper enclosure portion, particularly when it fits over the outside of the widened flange portion of the lower enclosure portion, as here, provides a desirable handle or gripping surface for removing the upper enclosure portion from the lower enclosure portion to clean the litter container.

It is also desirable, in a construction of the foregoing type, to provide a relatively free fit between the upper and lower enclosure portions. This provides ease of manufacturing and lower cost. It also ensures easy separability of the upper enclosure portion from the lower enclosure portion. This type of free fitting construction, however, while having important advantages, may lead to the urine collection and urine leakage problem discussed above.

OBJECTS OF THE INVENTION

It is therefore an object of the present invention to overcome the foregoing drawbacks and provide a litter container having upper and lower enclosure portions which may fit together relatively freely or loosely so as to be easily separated from each other but wherein urine is prevented from escaping or collecting in the joint between the enclosure portions.

It is a further object of the invention to provide an animal litter container which is of a simple and inexpensive construction with easily separable upper and lower enclosure portions and wherein urine is prevented from escaping from or collecting in the joint between the enclosure portions.

It is a further object of the invention to provide an animal litter container wherein urine entering the region of the joint between the upper and lower enclosure portions is directed away from the joint and toward the bottom of the lower enclosure portion which contains the litter.

It is another object of the invention to provide an animal litter container with widened rims or flanges which both provide a bearing region for joining the upper and lower enclosure portions together, provide a handle or gripping area for easy separability of the enclosure portions, and which also direct urine toward the bottom of the lower enclosure portion and away from the bearing area in the joint between the two enclosure portions.

It is a further object of the invention to provide an animal litter container having easily separable enclosure portions which may be constructed entirely of a resilient, plastic material and wherein urine is prevented from escaping from or collecting in the joint between the enclosure portions.

These, and other objects, advantages, and features of the present invention will be apparent from the specification which follows and from the drawing.

SUMMARY

To overcome the drawbacks of the prior art and to achieve the foregoing objects, the litter container of the present invention includes upper and lower enclosure portions which define an enclosed space when coupled together. One of the enclosure portions includes a means for providing access for an animal to the enclosed space. Also included is means between the upper and lower enclosure portions for coupling the enclosure portions together, the upper enclosure portion including a portion projecting into the enclosed space. This projecting portion extends substantially entirely around the upper enclosure portion and has a free extremity which is spaced from the coupling means.

The upper enclosure portion includes a main body portion and a widened rim portion disposed outwardly of the main body portion. The widened rim portion extends about the entire periphery of the upper enclosure portion, one part of the widened rim portion providing the projecting portion. The projecting portion may take the form of a downwardly convex convolution in the widened rim portion, the crest or vertex of the convolution providing the aforementioned free extremity. The widened rim portion also includes a bearing portion which engages with an upper edge of the lower enclosure portion to provide the coupling between the enclosure portions. The bearing portion of the upper enclosure portion is disposed outwardly of the projecting portion in the widened rim portion and at a level above the projection portion. The bearing portion is provided by a downwardly concave convolution in the widened rim portion, and the vertex of this convolution provides the bearing portion against which the upper edge of the lower enclosure portion engages. When urine is directed into the region between the upper and lower enclosure portions, it will flow by gravity to the free extremity or vertex of the projecting portion and drip therefrom. Since the bearing portion is spaced outwardly of the free extremity of the projecting portion, urine cannot flow to the bearing portion.

The lower enclosure portion includes a main container portion and a widened flange portion, the widened flange portion extending about the entire periphery of the lower enclosure portion. The widened flange portion includes an outwardly extending shoulder, and a generally vertical flange wall with an upper edge. The upper edge bears against the bearing portion of the upper enclosure portion to couple respective portions together. The outwardly extending shoulder has an undulating configuration which includes an inner, upwardly bowed portion adjacent the main container portion and an outer, downwardly bowed portion adjacent the outer, vertical flange wall. A plurality of downwardly and inwardly sloping channels extend from the downwardly bowed portion of the shoulder, through the upwardly bowed portion thereof, and to the main container portion. Urine dripping from the free extremity of the projecting portion on the upper enclosure portion will enter into the downwardly bowed portion of the widened flange on the lower enclosure portion and will drain through the channels into the litter containing cavity of the lower enclosure portion.

Each of the enclosure portions is of a one-piece construction. The enclosure portions are molded from a resilient plastic material, preferably low density polyethylene.

BRIEF DESCRIPTION OF THE DRAWING

FIG. 3 is a plan view of the lower enclosure portion of the animal litter container of FIG. 1 with the upper enclosure portion removed;

FIG. 4 is a horizontal sectional view taken on the line 4—4 of FIG. 2.

DETAILED DESCRIPTION OF THE PREFERRED EMBODIMENT

Figure 1:
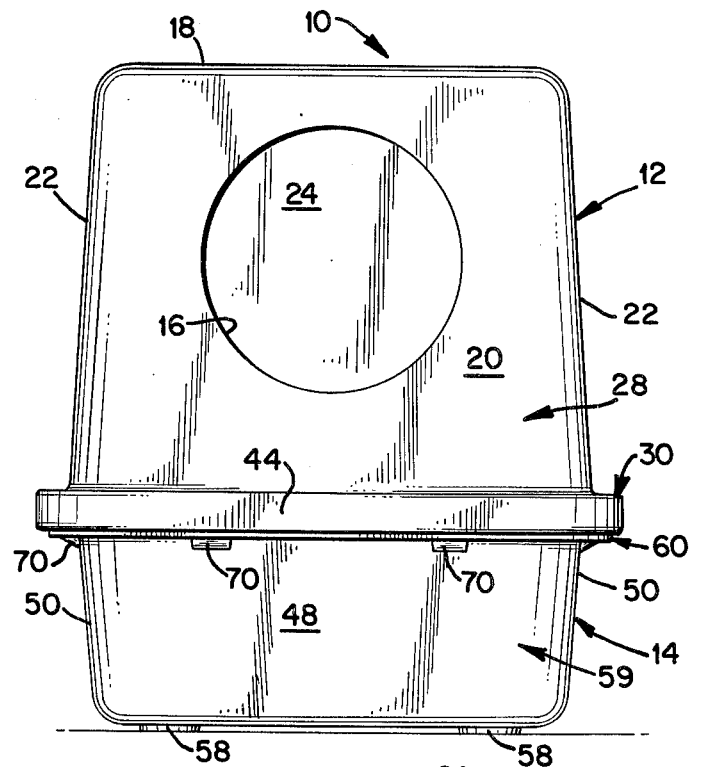
FIG. 1 is a front elevation of the animal litter container of the present invention.
Figure 2:
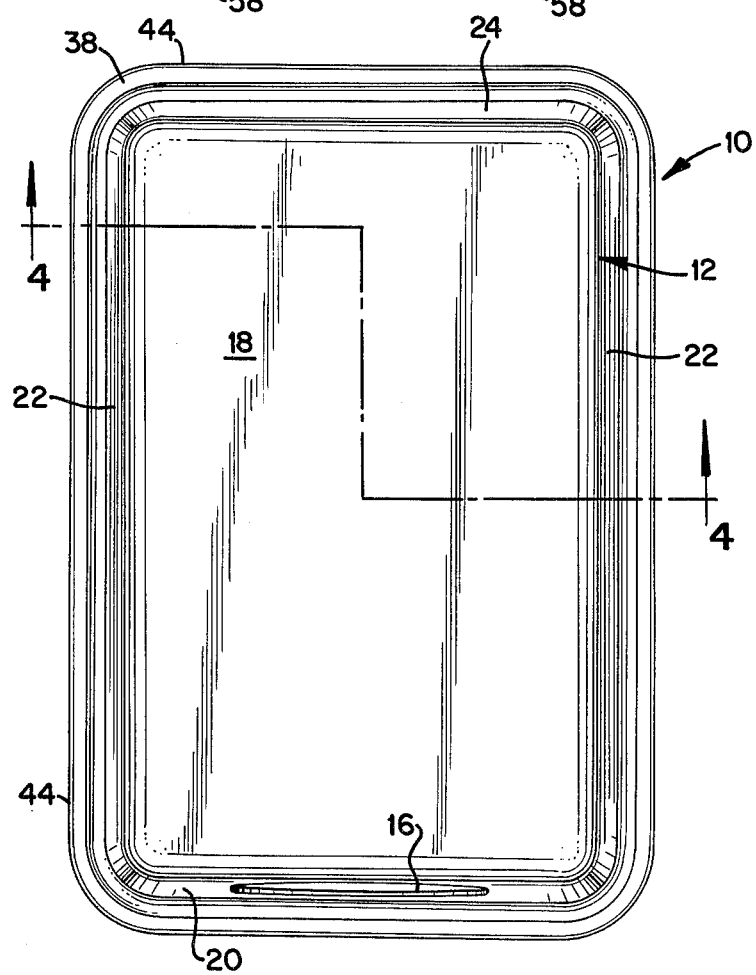
FIG. 2 is a plan view of the animal litter container of FIG. 1.

In the following description and in the drawing, like reference characters refer to like features or elements among the various figures of the drawing.

Referring to the drawing, the overall animal litter container is generally referred to by reference character 10. The container includes an upper enclosure portion 12 and a lower enclosure portion 14. Enclosure portions 12, 14 may be coupled together as shown in FIGS. 1 and 4 to define a space which is completely enclosed except for an opening 16, which opening provides access for an animal to the enclosed space.

Upper enclosure portion 12 includes a top wall 18, a front wall 20, oppositely disposed side walls 22, and a rear wall 24. Opening 16 is in the front wall 20. Together walls 18, 20, 22 and 24 define a cavity 26 (see FIG. 4) which forms part of the enclosed space defined by the overall container 10. Walls 18, 20, 22 and 24 form the main body portion 28 of upper enclosure portion 12.

Extending outwardly from main body portion 28 is a widened rim portion 30. Widened rim portion 30 extends entirely around the periphery of upper enclosure portion 12. Widened rim portion 30 includes a downwardly projecting portion 32 (see FIG. 4) extending entirely around the upper enclosure portion. Projecting portion 32 includes a free extremity 34 disposed in the enclosed space formed by the upper and lower enclosure portions 12, 14. Free extremity 34 is spaced inwardly from the joint or coupling between the enclosure portions. As will be apparent from FIG. 4, projecting portion 32 is defined by a downwardly convex convolution in widened rim portion 30 of upper enclosure portion 12. As will also be apparent from FIG. 4, the free extremity 34 of projecting portion 32 is provided by the vertex or crest of the downwardly convex convolution which forms projecting portion 32.

The litter container 10 includes a coupling or joint 36 between the upper and lower enclosure portions. Coupling 36 is provided, in part, by a downwardly concave convolution 38 in the widened rim portion. As will be apparent from FIG. 4 downwardly concave convolution 38 is disposed outwardly of projecting portion 32. Convolution 38 extends entirely around the periphery of upper enclosure portion 12, entirely outside projecting portion 32. The vertex of downwardly concave convolution 38 provides a bearing portion 40 in the upper enclosure portion 12. An upper edge 42 of lower enclosure portion 14 abuttingly engages bearing portion 40 to provide the coupling 36 between enclosure portions 12, 14. Bearing portion 40 extends around upper enclosure portion 12 interiorly of and at a level above the level of free extremity 34 of projecting portion 32. That is, the free extremity or vertex 34 is spaced inwardly from bearing portion 40 and disposed therebelow.

Widened rim portion 30 of upper enclosure portion 12 includes an outer vertical rim wall 44, the bottom edge of which has an inwardly extending lip 46 which extends around the entire upper enclosure portion 12.

Lower enclosure portion 14 includes a front wall 48, oppositely disposed side walls 50, a rear wall 52 and a bottom wall 54. Together these walls form a cavity 56 (FIG. 4). Cavity 56 forms part of the enclosed space defined by the overall litter container 10. The litter or other absorbent and/or loose material for receiving animal excretions will be contained in cavity 56. A set of surface engaging feet 58 extend downwardly from bottom wall 54.

Walls 48, 50, 52 and 54 form a main container portion 59 of lower enclosure portion 14. Extending outwardly from main container portion 59 is a widened flange portion 60. Widened flange portion 60 extends about the entire periphery of lower enclosure portion 14 at the upper end thereof, i.e. the end which engages with the lower end of upper enclosure portion 12. Widened flange portion 60 includes an outwardly extending shoulder 62 and an upstanding vertical flange wall 64. The top of vertical flange 64 forms the aforementioned upper edge 42 which engages with the bearing portion 40 of upper enclosure portion 12 to couple the enclosure portions together. As will be apparent from FIG. 4, the shoulder 62 of widened flange portion 60 has an undulating configuration including an inner, upwardly bowed portion 66 adjacent main container portion 59, and an outer, downwardly bowed portion 68 adjacent vertical flange wall 64. A plurality of downwardly and inwardly sloping channels 70 extend from downwardly bowed portion 68 of widened flange portion 60, through upwardly bowed portion 66 thereof, and to the main container portion 59. Urine, entering into the downwardly bowed portion 68 extending around the lower enclosure portion, will drain through channel 70 into cavity 56 which contains the litter.

Each enclosure portion is of a one-piece molded construction. That is, walls 18, 20, 22 and 24 and widened rim portion 30 of upper enclosure portion 12 are all of one piece. Likewise, walls 48, 50, 52, and 54, feet 58, and widened flange portion 60 of lower enclosure 14 are all of one piece. Also, each enclosure portion consists, overall, of a one-piece wall of substantially uniform thickness. Each enclosure portion is constructed entirely of a resilient plastic material, preferably low density polyethylene.

The structure described above is particularly suitable for litter containers constructed of such materials, i.e. resilient plastic materials. Such materials have the advantages of ease of molding and unbreakability. Use of resilient plastic materials, however, calls for a construction which will render the respective enclosure portions somewhat rigid in the region where they are coupled together and a construction which is free from close tolerance requirements. Widened rim portion 30 of upper enclosure portion 12 and widened flange portion 60 of lower enclosure 14 achieve the desired rigidity. At the same time, the construction and configuration of the upper and lower enclosure portions in the regions of rim and flange portions 30, 60 is such as to provide relatively freely fitting parts for ease of separation, while at the same time preventing leakage of urine from or collection of urine in the joint between the sections.

In this latter regard, any urine sprayed by an animal against the walls of upper enclosure portion 12 and adhering thereto by surface attraction, or any urine sprayed into the region of the joint between the enclosure portions 12, 14, will flow to the free extremity 34 of projecting portion 32 and drip therefrom into the trough formed by the downwardly bowed portion 68 of lower enclosure portion 14. From there the urine will flow through the sloping channel 70 into the cavity 56 containing the litter. Because the portion of widened rim 30 disposed immediately outwardly of projecting portion 32 is at a level above free extremity 34 urine cannot flow upwardly and thence into the region of the joint between the sections. That is, the projecting portion 32, and in particular the free extremity 34 thereof, is spaced from the coupling means between the upper and lower enclosure portions, and this spacing prevents urine from flowing into the coupling means. In this instance, the coupling means includes the bearing portion 40 of the upper enclosure portion 12 and the upper edge 42 of the lower enclosure portion 14. In the preferred embodiment, these are located at a level above the free extremity 34 of the projecting portion 32.

In the preferred embodiment, the inwardly extending lip 46 of the outer vertical rim wall 44 of upper enclosure portion 12 engages the vertical flange wall 64 of the lower enclosure portion 14. The lip 46 maintains a spacing or at least a looseness between the major surfaces of rim wall 44 and flange wall 64, as will be apparent from FIG. 4. At the same time, however, lip 46 resiliently and grippingly engages vertical flange wall 64 to hold the enclosure portions together by the force of friction. That is, the lip both maintains a certain degree of freedom between rim 44 and flange 64 to permit relatively easy disengagement of the upper and lower enclosure portions when desired, yet at the same time the lip 46 provides a sufficient grip to normally hold the upper and lower enclosure portions together.

The term "enclosed space," when used herein to refer to the space defined by the upper and lower enclosure portions when joined together, includes not only the upper and lower cavities 26, 56 but also the interior space 72 (FIG. 4) extending around the litter container and defined by widened rim portion 30 and widened flange portion 60. It will be understood that the foregoing specification describes only a preferred embodiment which exemplifies the invention, and many modifications, variations, and other embodiments are possible. The invention, of course, is limited only by the scope of the appended claims.

What is claimed is:

1. An animal litter container comprising:
 (a) an upper enclosure portion defined by generally upstanding walls including a front wall, a rear wall, and a pair of side walls, and by a top wall extending between said generally upstanding walls;
 (b) a lower enclosure portion, said upper and lower enclosure portions defining an enclosed space when coupled together;
 (c) said upper enclosure portion including means for providing access for an animal to said enclosed space, said access means including an opening in one of said upstanding walls;
 (d) means between said upper and lower enclosure portions for coupling said enclosure portions together;
 (e) means for preventing liquid from collecting in said coupling means, said preventing means including a portion of said upper enclosure portion projecting into said enclosed space, said projecting portion extending substantially entirely around said upper enclosure portion and having a free extremity, said free extremity being spaced from said coupling means.

2. An animal litter container as defined in claim 1, wherein said coupling means extends entirely around the litter container, wherein said projecting portion is a downwardly convex convolution in said upper enclosure portion, said downwardly convex convolution having a vertex, said vertex providing said free extremity, said free extremity extending entirely around said upper enclosure portion entirely inwardly of said coupling means.

3. An animal litter container as defined in claim 1 wherein said coupling means includes a bearing portion in said upper enclosure portion, said bearing portion engaging with said lower enclosure portion, said bearing portion extending around said upper enclosure portion at a level above the level of said free extremity of said projecting portion.

4. An animal litter container as defined in claim 3 wherein said projecting portion is a downwardly convex convolution, said downwardly convex convolution having a vertex, said vertex being spaced from said bearing portion and disposed therebelow, said vertex providing said free extremity.

5. An animal litter container as defined in claim 3, wherein said upper enclosure portion includes a main body portion and a widened rim portion disposed outwardly of said main body portion, said widened rim portion extending about the entire periphery of said upper enclosure portion, one part of said widened rim portion providing said projecting portion.

6. An animal litter container as defined in claim 5 wherein said projecting portion is a downwardly convex convolution in said widened rim portion, said downwardly convex convolution having a vertex, said vertex providing said free extremity.

7. An animal litter container as defined in claim 6, wherein said coupling means includes a bearing portion in said widened rim portion, said bearing portion engaging said lower enclosure portion, and wherein said bearing portion is disposed outwardly of said projecting portion in said widened rim portion.

8. An animal litter container as defined in claim 7 wherein said lower enclosure portion includes an upper edge which engages with said bearing portion of said upper enclosure portion, and wherein said bearing portion is provided by a downwardly concave convolution in said widened rim portion, said downwardly concave convolution including a vertex disposed above said vertex of said downwardly convex convolution, said upper edge of said lower enclosure portion engaging said bearing portion in the region of said vertex of said downwardly concave convolution.

9. An animal litter container as defined in claim 5 wherein said widened rim portion includes an outer vertical rim wall, said vertical rim wall having a lower edge with an inwardly extending lip thereon, said inwardly extending lip grippingly engaging said lower enclosure portion.

10. An animal litter container as defined in claim 1 wherein said lower enclosure portion includes a main container portion and a widened flange portion, said widened flange portion extending about the entire periphery of said lower enclosure portion.

11. An animal litter container as defined in claim 10 wherein said widened flange portion includes an outwardly extending shoulder and a generally vertical flange wall, said coupling means including an upper edge on said vertical flange wall, said upper edge bearing against said upper enclosure portion to couple said upper and lower enclosure portions together.

12. An animal litter container as defined in claim 11 wherein said shoulder of said widened flange portion has an undulating configuration including an inner, upwardly bowed portion adjacent said main container portion and an outer, downwardly bowed portion adjacent said vertical flange wall.

13. An animal litter container as defined in claim 12 wherein said lower enclosure portion includes a cavity for containing litter, said lower enclosure portion also including a plurality of downwardly and inwardly sloping channels extending from said downwardly bowed portion of said widened flange portion, through said upwardly bowed portion thereof, and to said main container portion, whereby liquid entering into said downwardly bowed portion will drain through said channels into said cavity.

14. An animal litter container as defined in claim 1 wherein each of said enclosure portions is of one piece.

15. An animal litter container as defined in claim 14 wherein each enclosure portion is constructed of low density polyethylene.

16. An animal litter container comprising:
(a) an upper enclosure portion;
(b) a lower enclosure portion, said upper and lower enclosure portions defining an enclosed space when coupled together;
(c) one of said enclosure portions including means for providing access for an animal to said enclosed space;
(d) means between said upper and lower enclosure portions for coupling said enclosure portions together;
(e) said upper enclosure portion including a portion projecting into said enclosed space, said projecting portion extending substantially entirely around said upper enclosure portion and having a free extremity, said free extremity being spaced from said coupling means;
(f) said coupling means including a bearing portion in said upper enclosure portion, said bearing portion engaging with said lower enclosure portion, said bearing portion extending around said upper enclosure portion at a level above the level of said free extremity of said projecting portion;
(g) said upper enclosure portion including a main body portion and a widened rim portion disposed outwardly of said main body portion, said widened rim portion extending about the entire periphery of said upper enclosure portion, one part of said widened rim portion providing said projecting portion;
(h) said widened rim portion including an outer vertical rim wall, said vertical rim wall having a lower edge with an inwardly extending lip thereon, said inwardly extending lip grippingly engaging said lower enclosure portion.

17. An animal litter container comprising:
(a) an upper enclosure portion;
(b) a lower enclosure portion, said upper and lower enclosure portions defining an enclosed space when coupled together;
(c) one of said enclosure portions including means for providing access for an animal to said enclosed space;
(d) means between said upper and lower enclosure portions for coupling said enclosure portions together;
(e) said upper enclosure portion including a portion projecting into said enclosed space, said projecting portion extending substantially entirely around said upper enclosure portion and having a free extremity, said free extremity being spaced from said coupling means;
(f) said lower enclosure portion including a main container portion and a widened flange portion, said widened flange portion extending about the entire periphery of said lower enclosure portion;
(g) said widened flange portion including an outwardly extending shoulder and a generally vertical flange wall, said coupling means including an upper edge on said vertical flange wall, said upper edge bearing against said upper enclosure portion to couple said upper and lower enclosure portions together;
(h) said shoulder of said widened flange portion having an undulating configuration including an inner, upwardly bowed portion adjacent said main container portion and an outer, downwardly bowed portion adjacent said vertical flange wall;
(i) said lower enclosure portion including a cavity for containing litter, said lower enclosure portion also including a plurality of downwardly and inwardly sloping channels extending from said downwardly bowed portion of said widened flange portion, through said upwardly bowed portion thereof, and to said main container portion, whereby liquid entering into said downwardly bowed portion will drain through said channels into said cavity.

* * * * *